United States Patent [19]

Irie

[11] Patent Number: 5,582,666

[45] Date of Patent: Dec. 10, 1996

[54] METHOD OF FORMING A RADIAL TIRE

[75] Inventor: Nobuhiko Irie, Nagasaki, Japan

[73] Assignee: Mitsubishi Jukogyo Kabushiki Kaisha, Tokyo, Japan

[21] Appl. No.: 413,953

[22] Filed: Mar. 30, 1995

[30] Foreign Application Priority Data

Apr. 11, 1994 [JP] Japan .................................. 6-072095
Apr. 26, 1994 [JP] Japan .................................. 6-088376

[51] Int. Cl.$^6$ .................................................. B29D 30/20
[52] U.S. Cl. .......................... 156/111; 156/126; 156/133; 156/396
[58] Field of Search .................................. 156/111, 126, 156/127, 130.7, 133, 406.2, 396

[56] References Cited

U.S. PATENT DOCUMENTS

| 2,407,152 | 9/1946 | Haase . | |
| 3,192,087 | 6/1965 | Close et al. . | |
| 4,230,517 | 10/1980 | Enders . | |
| 4,268,330 | 5/1981 | Komatsu et al. | 156/111 |
| 4,685,992 | 8/1987 | Irie | 156/396 |
| 4,792,370 | 12/1988 | Goodfellow | 156/396 |

FOREIGN PATENT DOCUMENTS

| 0069047 | 1/1983 | European Pat. Off. . |
| 0190532 | 8/1986 | European Pat. Off. . |
| 2545381 | 4/1977 | Germany . |
| 59-70548 | 4/1984 | Japan . |
| 2038730 | 7/1980 | United Kingdom . |

*Primary Examiner*—Geoffrey L. Knable
*Attorney, Agent, or Firm*—Jacobson, Price, Holman & Stern, PLLC

[57] ABSTRACT

A method of forming a radial tire. After a carcass band is elastically deformed temporarily into a standing wave shape, a bead core is located at a predetermined position on the outside of the carcass band. The elastic deformation of the carcass band is eliminated, and the carcass band is pressed against the inner peripheral surface of the bead core to form a first assembly. The first assembly is held by a first transfer from the outside, and an inner liner band of cylindrical shape with an outside diameter smaller than the inside diameter of the first assembly, is located at a predetermined position in the first assembly. The inner liner band is expanded and pressed against the inner peripheral surface of the first assembly to form a second assembly. Then, a third assembly composed of a sidewall, chafer and the like of cylindrical shape and having an outside diameter smaller than the inside diameter of the second assembly, is located at a predetermined position in the second assembly. The third assembly is expanded and pressed against the inner peripheral surface of the second assembly to forms fourth assembly, and the fourth assembly held by the first transfer is moved to a predetermined position on the shaping drum, where the fourth assembly is formed into a toroidal shape and assembled to a belt-tread assembly, which is formed into a cylindrical shape separately, to form a green tire.

2 Claims, 6 Drawing Sheets

METHOD OF FORMING A RADIAL TIRE

BACKGROUND OF THE INVENTION

The present invention relates to a method of forming a radial tire and an apparatus therefor.

In manufacturing a radial tire, a tire manufacturing system (a tire manufacturing system used in carrying out the one-stage forming method) is used, which, as shown in FIG. 5, comprises an expandable belt-tread assembly forming drum a, a mount b rotatably supporting the drum a and having an expanding/contracting mechanism, a material supply device c for supplying components of the belt-tread assembly to the drum a, a carcass forming drum d which can be expanded/contracted to a cylindrical state and a toroidal state, a mount e which rotatably supports the drum d, has expanding/contracting means, and further has an approaching/leaving mechanism for adjusting a bead clearance, a material supply device f for supplying components, such as an inner liner, chafer, carcass ply, and sidewall, composing of a carcass to the drum d, a carrier g having an expandable holding claw which installs the belt-tread assembly to the outer periphery of a green carcass formed into a toroidal shape by the drum d by moving the assembly on the drum a to the position of the drum d while holding the assembly from the outside and removes a finished green tire from the drum d while holding the green tire from the outside and means which installs a left bead core to a predetermined position when the green tire is at the position of the drum d, a rail and drive device h for moving the carrier g, a pressing device i for appropriately pressing the assembly on the drum a, and a pressing device j for the belt-tread assembly delivered from the carrier g to the green carcass. For the above-described tire manufacturing system, Japanese Patent Provisional Publication No. 54-125277 (No. 125277/1979) should be referred to, if necessary.

In this tire manufacturing system, the drum a and the drum d are coaxially arranged so as to face each other. On the drum d, (1) First, a sidewall SW is wound on the right and left portions composing the tire side wall and joined.

(2) Then, cushion rubber CR and the like for protecting the tire in contact with the wheel portion when installed on the car is wound and joined.

(3) Then, an inner liner rubber sheet IL is wound and joined.

(4) Then, a rubber sheet (usually called a carcass ply CP) including fibers (in most cases, steel cords arranged in parallel in the axial direction of the drum d) is wound and joined.

(5) Bead cores BC are arranged at the right and left symmetrically with respect to the center of the drum d at the outside of the above materials. FIG. 6 shows a state in which the process (5) is completed after the processes (1) to (4) have been carried out.

(6) Then, the bead core lower part of the drum is expanded so that the material layer on the drum d is pressed against the inner peripheral portion of the bead core. FIG. 7 shows this state.

(7) Then, compressed air is supplied while the clearance of the bead cores is decreased. After the material layer is formed into a toroidal shape, the material layer at the outer end portion of the bead core is folded back so as to wrap the bead core, and pressed against the toroidal material layer.

(8) At an appropriate time during the above work, a belt-tread assembly, which has been assembled in advance, is placed at the center of both bead cores. The inner surface of the assembly is extended in a toroidal shape, and joined to the material layer. Finally, the assembly and the material layer are formed under pressure by using the pressing device to complete the tire.

The drum d is made up of an elastic body for the purpose of the above processes (5), (6), and (7), so that the surface thereof is soft. In addition, the rubber material such as the sidewall wound on the surface of the drum d is of a long-base triangular shape in cross section. Therefore, when the inner liner rubber sheet and the carcass ply are wound, the material does not have a flat surface, but has an irregular surface as shown in FIG. 8.

For this reason, when an operator attempts to wind and join the inner liner rubber sheet and the carcass ply, it is very difficult to do the work. More specifically, it is very difficult to keep the joining lap uniform throughout the joined portion. As a result, the quality of the product tire becomes unstable and productivity decreases remarkably. Also, it is difficult to make the work automatic because the surface of the drum d, which is the base of winding, is unstable and irregular as described above.

In such a situation, the applicant has already proposed a forming method and apparatus in which, as shown in FIGS. 9 to 12, the inner liner IL and the carcass ply CP are affixed to each other into a cylindrical shape in advance on a band drum having a cylindrical outer peripheral surface to form a carcass band, which is transferred onto the green carcass forming drum d by means of a carcass transfer KT. In this case, because the sidewall SW is of a long-base triangular shape in section, the sidewall SW must be wound on the green carcass forming drum (also called a shaping drum) and must be joined manually into a cylindrical shape.

With this method, the sidewall SW is of a long-base triangular shape, so that when it is cut to a regular size, the length of the thinner portion tends to shrink as compared with the thicker portion and the cut surface has an acute angle in the base direction. Therefore, in joining the leading and trailing ends, it is necessary to expand the thinner portion and to bring the ends into contact so that the distance in the radial direction from the drum center is equal. Also, when the sidewall SW is formed into a toroidal shape, it is necessary to join the thicker portion under pressure enough to prevent it from coming off. However, since the outside diameter of the drum is not uniform in the axial direction, the above-described joining work on the shaping drum requires careful manual work performed by a skilled worker.

Also, it is difficult to make the joining work automatic because a supply device (servicer) for the members around the bead and a stitcher as well as a metal chafer lie around the green carcass forming drum d, so that a space for installing automatic joining device cannot be secured. For the above-described tire forming method, Japanese Patent Provisional Publication No. 59-70548 (No. 70548/1984) should be referred to, if necessary.

SUMMARY OF THE INVENTION

The present invention was made to solve the above problems. Accordingly, an object of the present invention is to provide a method of forming a radial tire and an apparatus therefor, which (1) can make the work for joining the leading and trailing ends of sidewall automatic and can secure a space for installing an automatic joining apparatus, and (2) can improve productivity.

To achieve the above object, a method of forming a radial tire in accordance with the present invention, which includes a process in which a carcass ply which is joined in advance into a cylindrical shape are formed by being expanded on a shaping drum so as to wrap a bead core, comprises the steps of: deforming elastically a carcass band, which has been formed in advance on a second band forming drum into a cylindrical shape so that the outer peripheral length thereof is equal to the inner peripheral length of the bead core, temporarily into a standing wave shape; locating the bead core at a predetermined position on the outside of the carcass band; eliminating the elastic deformation of the carcass band; pressing the carcass band against the inner peripheral surface of the bead core to form a first assembly; holding the first assembly by a first transfer from the outside; locating an inner liner band, which has been formed in advance by a first band forming drum into a cylindrical shape such that the outside diameter thereof is smaller than the inside diameter of the first assembly, at a predetermined position in the first assembly held by the first transfer; expanding and pressing the inner liner band against the inner peripheral surface of the first assembly to form a second assembly; locating a third assembly composed of a sidewall, chafer, and the like, which has been formed in advance by a third band forming drum into a cylindrical shape such that the outside diameter thereof is smaller than the inside diameter of the second assembly, at a predetermined position in the second assembly; expanding and pressing the third assembly against the inner peripheral surface of the second assembly to form a fourth assembly; and moving the fourth assembly held by the first transfer to a predetermined position on the shaping drum, where the fourth assembly is formed into a toroidal shape and assembled to a belt-tread assembly, which is formed into a cylindrical shape separately, to form a green tire.

Also, an apparatus for forming a radial tire in accordance with the present invention, performs a process in which a carcass ply and the like joined in advance into a cylindrical shape are formed by being expanded on a shaping drum so as to wrap a bead core, comprises: a first band forming drum movable between positions (POS.a-1) and (POS.a) on a first axis A—A; a second band forming drum movable between positions (POS.a-2) and (POS.a) on the first axis A—A; a third band forming drum movable between position (POS.b) on a second axis B—B parallel to the first axis A—A and a plurality of positions determined by the number of kinds of assembled members; a shaping drum movable between positions (POS.c-1) and (POS.c) on a third axis C—C parallel to the first axis A—A; a belt drum movable between position (POS.c-2) on the third axis C—C and a plurality of positions determined by the number of kinds of assembled members; a first transfer movable between the intersections (POS.a), (POS.b) and (POS.c) of the first axis A—A, the second axis B—B, and the third axis C—C along a line D—D at right angles to these axes; and a second transfer movable between positions (POS.c) and (POS.c-2) on the third axis C—C.

The present invention is configured as described above. Therefore, in the method of forming a radial tire, which includes a process in which a carcass ply and the like joined in advance into a cylindrical shape is formed by being expanded on a shaping drum so as to wrap a bead core, after a carcass band, which has been formed in advance on a second band forming drum into a cylindrical shape so that the outer peripheral length thereof is equal to the inner peripheral length of a bead core, is elastically deformed temporarily into a standing wave shape, the bead core is located at a predetermined position on the outside of the carcass band. The elastic deformation of the carcass band is eliminated, and the carcass band is pressed against the inner peripheral surface of the bead core to form a first assembly. The first assembly is held by a first transfer from the outside, and an inner liner band, which has been formed in advance by a first band forming drum into a cylindrical shape such that the outside diameter thereof is smaller than the inside diameter of the first assembly, is located at a predetermined position in the first assembly held by the first transfer. The inner liner band is expanded and pressed against the inner peripheral surface of the first assembly to form a second assembly. Then, a third assembly composed of a sidewall, chafer, and the like, which has been formed in advance by a third band forming drum into a cylindrical shape such that the outside diameter thereof is smaller than the inside diameter of the second assembly, is located at a predetermined position in said second assembly. The third assembly is expanded and pressed against the inner peripheral surface of the second assembly to form a fourth assembly, and the fourth assembly held by the first transfer is moved to a predetermined position on the shaping drum, where the fourth assembly is formed into a toroidal shape and assembled to a belt-tread assembly, which is formed into a cylindrical shape separately, to form a green tire. Further, to achieve the above object, another radial tire forming method in accordance with the present invention, which performs a process in which a carcass ply and the like joined in advance into a cylindrical shape are formed by being expanded on a shaping drum so as to wrap a bead core, comprises the steps of: laminating a carcass ply on the outer periphery of the inner liner band, which is formed into a cylindrical shape on a first band forming drum, to form a carcass band; locating a bead core at a predetermined position on the outside of the carcass band by relatively moving, in a coaxial manner, the first band forming drum and a first transfer holding the bead core in advance; expanding and pressing-the carcass band against the inner peripheral surface of the bead core to form a first assembly; forming a second assembly, in which the outside diameter of a sidewall, reinforcement band, and the like is smaller than the inside diameter of the first assembly, by a second band forming drum during the time when the first assembly is held by the first transfer; locating the first assembly at a predetermined position on the outside of the second assembly by relatively moving, in a coaxial manner, the first transfer and the second band forming drum; expanding the second assembly and integrating it with the first assembly to form a third assembly; transferring the third assembly from the first transfer to a shaping drum; forming the third assembly into a toroidal shape so as to wrap the bead core by expanding the shaping drum; and assembling a belt-tread assembly, which is a fourth assembly formed by joining in a cylindrical shape in advance on a belt drum, to the third assembly to complete a green tire.

Further, in the above-described radial tire forming method in accordance with the present invention, after the bead core is located at a predetermined position on the outside of the carcass ply formed into a cylindrical shape by the first band forming drum, the carcass ply is expanded and pressed against the inner peripheral surface of the bead core to form a 1—1 assembly, the 1—1 assembly is relatively moved to, in a coaxial manner, and located at a predetermined position on the outside of an inner liner 1-2 assembly, which is formed into a cylindrical shape such that the outside diameter thereof is smaller than the inside diameter of the 1—1 assembly by the first band forming drum, by being held by the first transfer, and then the inner liner is expanded and pressed against the 1—1 assembly to form the first assembly.

Further, in the above-described radial tire forming method in accordance with the present invention, after the carcass band or carcass ply formed by the first band forming drum into a cylindrical shape so that the outer peripheral length thereof is equal to the inner peripheral length of the bead core, a carcass ply is elastically deformed temporarily into a standing wave shape inward in the radial direction, the bead core is located at a predetermined position on the outside of the carcass band or carcass ply, the elastic deformation of the carcass band or carcass ply is eliminated, and then the carcass band or carcass ply is pressed against the inner peripheral surface of the bead core to form the first assembly.

Also, an apparatus for forming a radial tire in accordance with the present invention, which performs a process in which a carcass ply and the like joined in advance into a cylindrical shape are formed by being expanded on a shaping drum so as to wrap a bead core, comprises: a first band forming drum movable between positions (POS.a), (POS.a-1) and (POS.a-2) on a first axis a—a; a second band forming drum movable between position (POS.a) on the first axis a—a and a plurality of positions determined by the number of kinds of assembled members; a shaping drum movable between positions (POS.b) and (POS.b-1) on a second axis b—b parallel to the first axis a—a; a belt drum movable between position (POS.b-2) on the second axis b—b and a plurality of positions determined by the number of kinds of assembled members; a first transfer, movable between position (POS.a) on the first axis a—a and position (POS.b) on the second axis b—b, for holding and transferring a member including a bead core, inner liner, carcass ply, sidewall, and the like and a second transfer, movable between positions (POS.b-1) and (POS.b-2) on the second axis b—b, for receiving a belt-tread assembly assembled on the belt drum and delivering the belt-tread assembly at the position of the shaping drum.

In the present invention, therefore, a green tire is formed by the following procedure.

(1) A carcass ply is laminated on the outer periphery of an inner liner, which is formed into a cylindrical shape on the first band forming drum, to form a carcass band, and the first band forming drum and the first transfer holding a bead core in advance are relatively moved in a coaxial manner. After a bead core is located at a predetermined position on the outside of the carcass band, the carcass band is expanded and pressed against the inner peripheral surface of the bead core to form a first assembly, which is held by the first transfer.

(2) Alternatively, a carcass ply is wound on the outer peripheral surface of the first band forming drum and formed into a cylindrical shape, and the first transfer holding a bead core in advance is relatively moved in a coaxial manner. After the bead core is located at a predetermined position on the outside of the carcass ply, the carcass ply is expanded and pressed against the inner peripheral surface of the bead core to form a 1—1 assembly, which is held by the first transfer. After an inner liner is formed into a cylindrical 1-2 assembly such that the outside diameter thereof is smaller than the inside diameter of the 1—1 assembly on the first band forming drum and the 1-2 assembly is located at a predetermined position on the inside of the second assembly, the inner liner is expanded and pressed against the inner surface of the 1—1 assembly held by the first transfer to form a first assembly.

(3) Alternatively, a carcass ply, which is formed so that the outer peripheral length thereof is equal to the inner peripheral length of the bead core by the first band forming drum, is elastically deformed temporarily into a standing wave shape inward in the radial direction. Then, the first transfer holding the bead core in advance and the first band forming drum are relatively moved in a coaxial manner, and the bead core is located at a predetermined position on the outside of the carcass ply. After that, the elastic deformation of the carcass ply is eliminated, and the carcass ply is pressed against the inner peripheral surface of the bead core to form a 1—1 assembly, which is held by the first transfer. After an inner liner is formed into a cylindrical 1-2 assembly such that the outside diameter thereof is smaller than the inside diameter of the 1—1 assembly on the first band forming drum and the 1-2 assembly is located at a predetermined position on the inside of the second assembly, the inner liner is expanded and pressed against the inner surface of the 1—1 assembly held by the first transfer to form a first assembly.

(4) During this time, on the second band forming drum, a sidewall, reinforcement band around the bead, and the like are joined in sequence and formed into a cylindrical shape to form a second assembly.

(5) Then, the first transfer holding the first assembly and the second band forming drum are relatively moved in a coaxial manner. After the second assembly is located at a predetermined position in the first assembly, the second assembly is expanded and pressed against the first assembly to form a third assembly.

(6) The first transfer and the shaping drum are moved, and the third assembly held by the first transfer is transferred to the shaping drum. Then, the shaping drum is expanded, and the bead holding portions are brought close to each other to perform toroidal shape. A belt-tread assembly (fourth assembly), which has been laminated in advance into a cylindrical shape on the belt drum, is transferred by the second transfer, and assembled to the third assembly at proper timing during shaping. Thus, the formation of a green tire is completed.

The present invention, which is configured as described above, can achieve the following effects: In the conventional method of forming a radial tire and apparatus therefor, the sidewall SW has a long-base triangular shape, so that when it is cut to a regular size, the length of the thinner portion tends to shrink as compared with the thicker portion and the cut surface has an acute angle in the base direction. Therefore, in joining the leading and trailing ends, it is necessary to expand the thinner portion and to bring the ends into contact so that the distance in the radial direction from the drum center is equal. Also, when the sidewall SW is formed into a toroidal shape, it is necessary to join the thicker portion under pressure enough to prevent it from coming off. However, since the outside diameter of the drum is not uniform in the axial direction, the above-described joining work on the shaping drum requires careful manual work performed by a skilled worker. Also, it is difficult to make the joining work automatic because a supply device (servicer) for the members around the bead and a stitcher as well as a metal chafer lie around the green carcass forming drum, so that a space for installing automatic joining device cannot be secured. On the contrary, in the method of forming a radial tire and apparatus therefor in accordance with the present invention, the members such as a sidewall are laminated and formed into a cylindrical third assembly (or second assembly) separately on separate drums. Therefore, problems of air entrance caused when the third assembly (or second assembly) is expanded and pressed against the first assembly and of the arrangement sequence of tire components (especially inner liner) can be solved. Moreover, a sidewall can be wound and joined on a third band forming drum (or second band forming drum) having a uniform diameter in the axial direction. Also, the locations where a tire component is wound on the third assembly (or second assembly) are distributed by making the third band forming drum (or second band forming drum) movable, so that the work for joining the leading and trailing ends of the sidewall can be made automatic, and the space for installing the automatic joining apparatus can be secured.

Further, the work for winding and shaping tire components can be performed in parallel at a plurality of locations (five locations in illustrated embodiment). Therefore, the actual rate of operation for each piece of equipment can be increased, and the productivity of the system can be improved.

DETAILED DESCRIPTION OF PREFERRED EMBODIMENT

Figure 1:
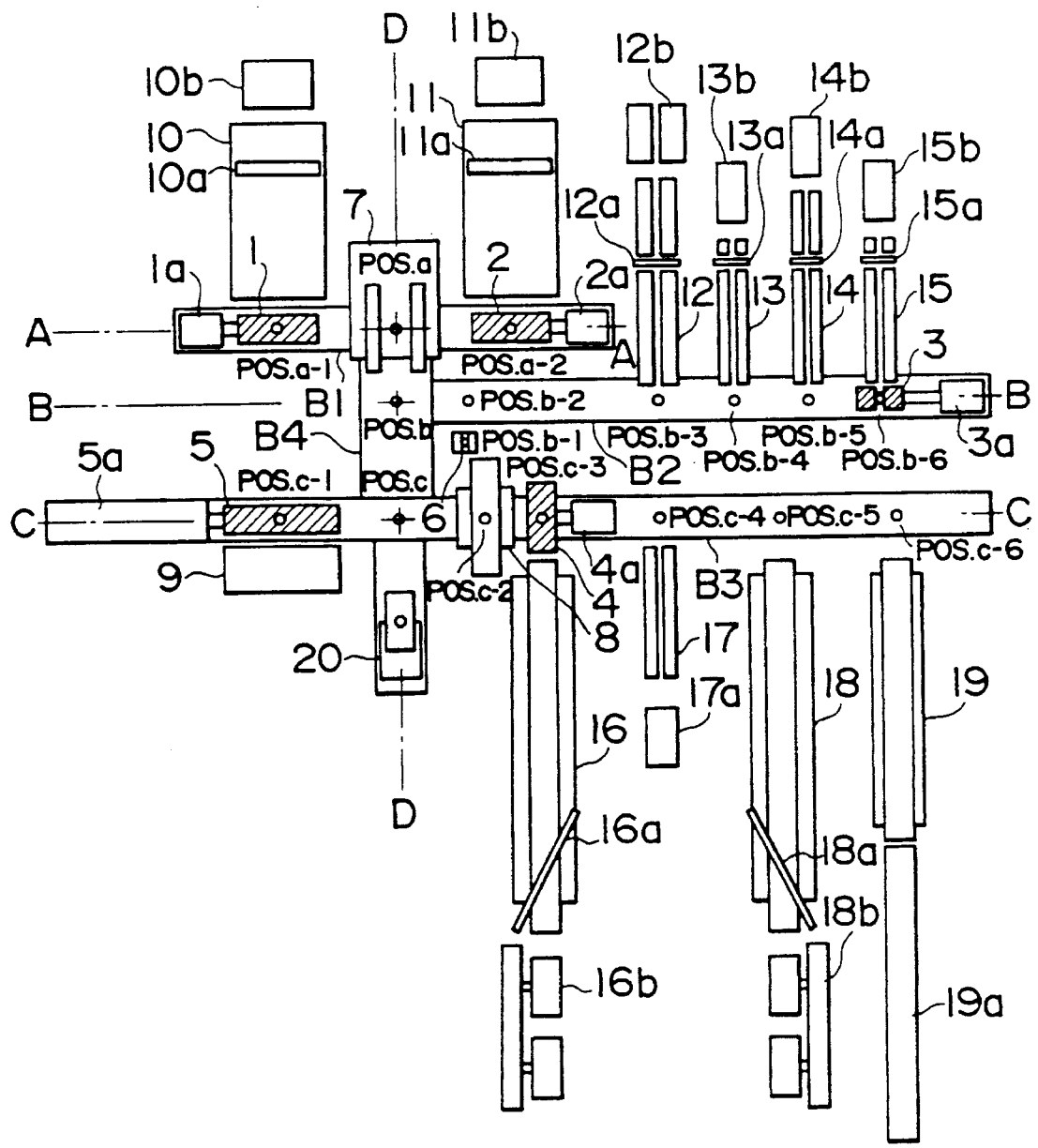
FIG. 1 is a plan view showing one embodiment of a forming apparatus used for carrying out a method of forming a radial tire in accordance with the present invention.

One embodiment of a forming apparatus used for carrying out a method of forming a radial tire in accordance with the present invention will be described with reference to FIG. 1.

Reference numeral 1 denotes a first band forming drum for an inner liner IL. This first band forming drum 1 can slide on a first common bed B1. The drum 1, having a head stock 1a incorporating drive means for rotating and expanding/contracting the first band forming drum 1, can move between positions (POS.a-1) and (POS.a) on a first axis A—A.

Reference numeral 2 denotes a second band forming drum for a carcass ply CP (also called a body ply). This second band forming drum 2 can slide on the first common bed B1. The drum 2, having a head stock 2a incorporating drive means for rotating and expanding/contracting the second band forming drum 2, can move between (POS.a) and (POS.a-2) on the first axis A—A.

Reference numeral 3 denotes a third band forming drum for a third assembly SW, which consists of a sidewall, a reinforcement band around a bead, and the like. This third band forming drum 3 can slide on a second common bed B2. The drum 3, having a head stock 3a incorporating drive means for rotating and expanding/contracting the third band forming drum 3, can move between (POS.b) and (POS.b-2)-(POS.b-6) on a second axis B—B.

Reference numeral 4 denotes a belt drum for a belt-tread assembly BT. This belt drum 4 can slide on a third common bed B3. The drum 4, having a head stock 4a incorporating drive means for rotating and expanding/contracting the belt drum 4, can move between positions (POS.c-2)-(POS.c-6) on a third axis C—C.

Reference numeral 5 is a shaping drum for assembling the tire components, which have been formed into a cylindrical shape in advance, and forming the assembled components into a toroidal shape to produce a green tire. This shaping drum 5 can slide on the third common bed B3. The drum 5, having a head stock 5a incorporating drive means for rotating and expanding/contracting the shaping drum 5 and for bringing bead holding portions close to each other and separating them from each other, can move between (POS.c-1) and (POS.c) on the third axis C—C.

Reference numeral 7 denotes a first transfer for transferring a bead core BC, a carcass ply CP, and the like to the shaping drum 5 by holding them from the outside. This first transfer 7 can slide on a fourth bed B4 connecting the first, second and third common beds B1, B2 and B3, being movable between the intersections (POS.a), (POS.b) and (POS.c) of the first axis A—A, the second axis B—B, and the third axis C—C along a line D—D at right angles to these axes.

Incidentally, reference numeral 6 denotes a bead supplier for supplying a bead core BC to the first transfer 7.

Reference numeral 8 denotes a second transfer for transferring a belt-tread assembly from the belt drum 4 to the shaping drum 5 by holding it from the outside. This second transfer 8 can slide on the third common bed B3, being movable between (POS.c-1) and (POS.c-2) on the third axis C—C.

Reference numeral 9 denotes a stitcher for pressing the tire member on the shaping drum 5 against the drum 5 and joining it.

Reference numeral 10 denotes a servicer for supplying an inner liner IL onto the first band forming drum 1, and 11 denotes a servicer for supplying a carcass ply CP onto the second band forming drum 2. These servicers 10 and 11 are provided with automatic cutters 10a and 11a for cutting a material to a regular size and let off stands 10b and 11b, respectively.

Reference numeral 12 denotes a servicer for supplying a sidewall SW, 13 denotes a servicer for supplying abrasion rubber, 14 denotes a servicer for supplying a metal chafer, and 15 denotes a servicer for supplying a sidewall filler. These servicers 12, 13, 14 and 15 are provided with automatic cutters 12a, 13a, 14a and 15a for cutting a material to a regular size and let off stands 12b, 13b, 14b and 15b, respectively.

Reference numerals 16 and 18 denote servicers for supplying a belt ply. These servicers 16 and 18 are provided with automatic cutters 16a and 18a for cutting a material to a regular size and let off stands 16b and 18b, respectively.

Reference numeral 17 denotes a servicer for supplying a belt wedge. This servicer 17 is provided with a let off stand 17a.

Reference numeral 19 denotes a servicer for supplying a tread. This servicer 19 is provided with a conveyor 19a for receiving a tread which has been cut to a regular size in advance and carried.

Reference numeral 20 denotes a tire unloader for taking a completely formed green tire out of the apparatus.

The above-described individual devices are known, and therefore the detailed description thereof is omitted.

Next, the operation of the radial tire forming apparatus shown in FIG. 1 will be described in detail.

Figure 8:
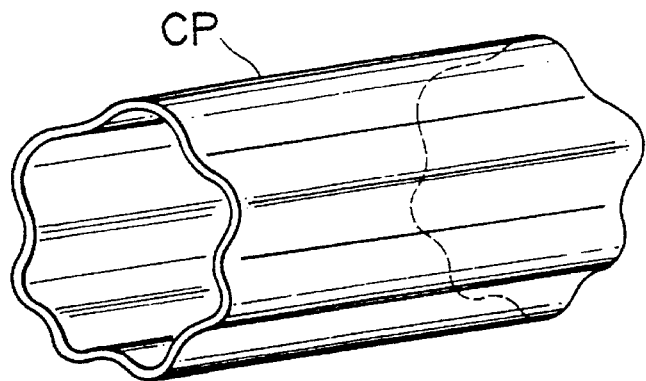
FIG. 8 is a perspective view showing a carcass ply elastically deformed into a standing wave shape inward in the radial direction.
Figure 9:
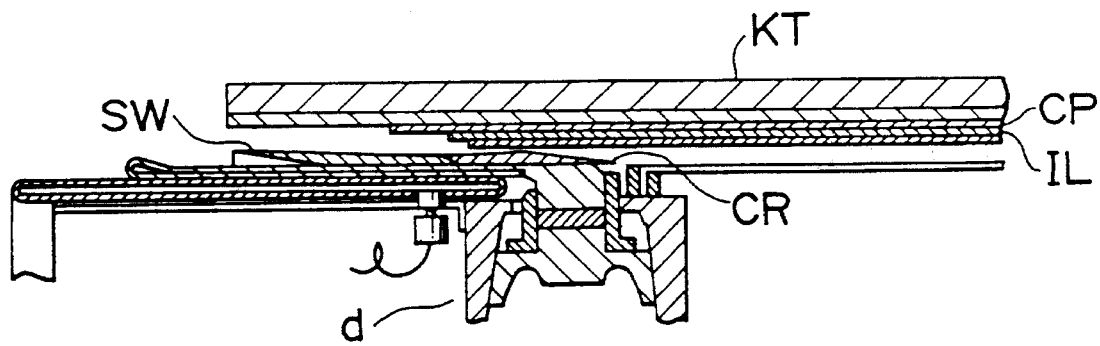
FIG. 9 is a view illustrating one state of a shaping drum of another conventional radial tire forming apparatus.
Figure 10:
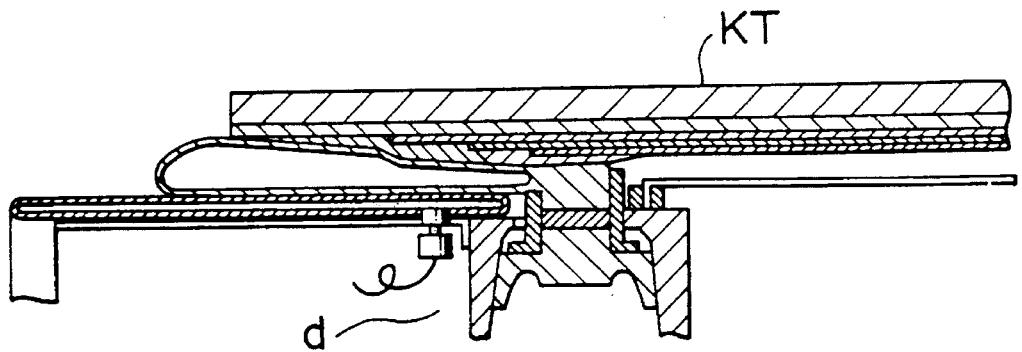
FIG. 10 is a view illustrating another state of the shaping drum of the conventional forming apparatus shown in FIG. 9.
Figure 11:
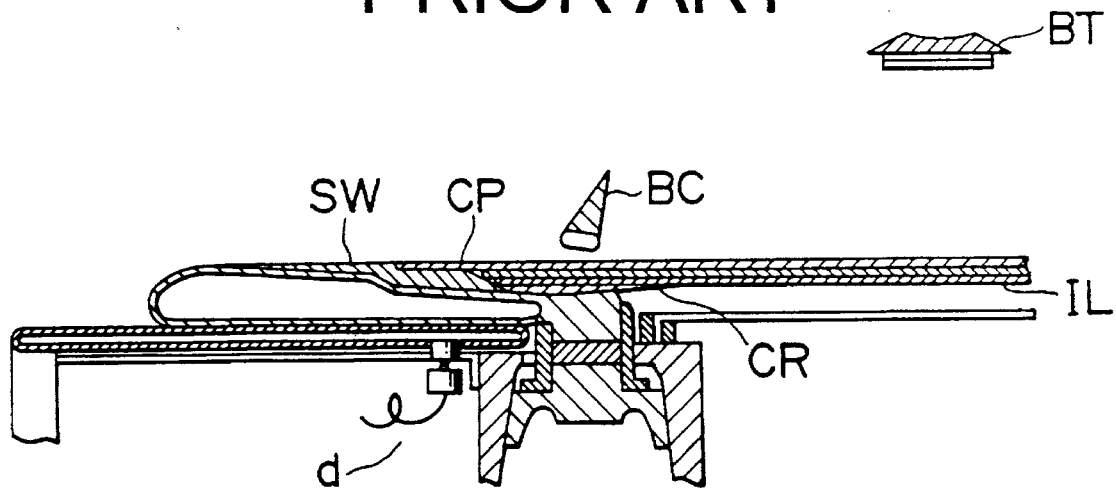
FIG. 11 is a view illustrating still another state of the shaping drum of the conventional forming apparatus shown in FIG. 9.
Figure 12:
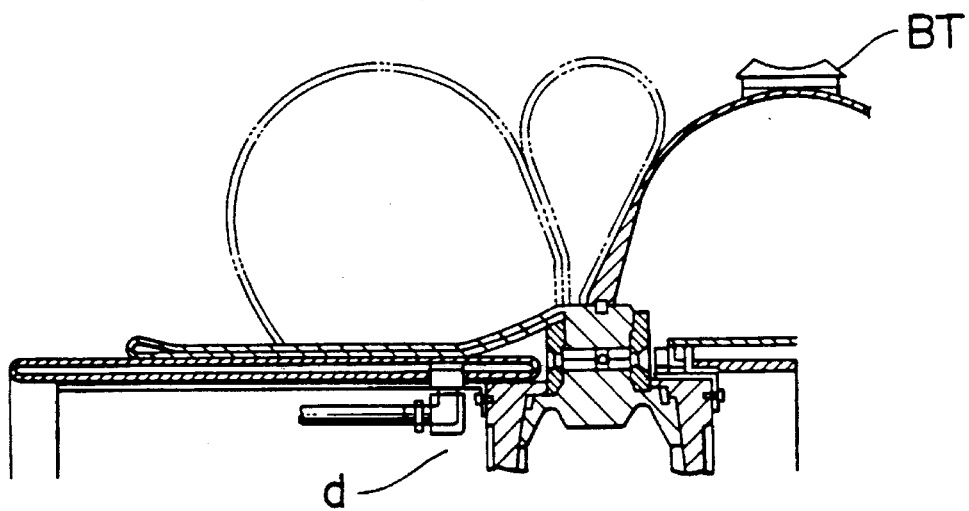
FIG. 12 is a view illustrating still another state of the shaping drum of the conventional forming apparatus shown in FIG. 9.

First, a carcass ply CP is wound on the second band forming drum 2, which is expanded so that the outer peripheral length of the carcass ply CP formed into a cylindrical shape is equal to the inner peripheral length of the bead core, at (POS.a-2) and joined to form a cylindrical shape. Then, the carcass ply CP is elastically deformed temporarily into a standing wave shape inward in the radial direction (refer to FIG. 8), and allowed to stand by.

Then, a bead core BC is supplied to the first transfer 7 by means of the bead supplier 6. When the first transfer 7 returns to (POS.a), the second band forming drum 2 is moved to (POS.a), where the carcass ply CP formed into a standing wave shape is inserted in the bead core BC. The elastic deformation of the carcass ply CP is eliminated by expanding the second band forming drum 2, and the carcass ply CP is pressed against the inner peripheral surface of the bead core BC to form a first assembly. The first assembly is held by the first transfer 7, and the second band forming drum 2 is contracted and returned to (POS.a-2).

On the first band forming drum 1, an inner liner IL is wound at (POS.a-1) and joined into a cylindrical shape in advance. The first band forming drum 1 is moved to (POS.a), and inserted in the first assembly held by the first transfer 7. By expanding the first band forming drum 1, the cylindrical inner liner is pressed against the inner peripheral surface of the first assembly to form a second assembly. Then, the first band forming drum 1 is contracted and returned to (POS.a-1).

During this period of time, the contracted third band forming drum 3 is moved between the positions (POS.b-3) to (POS.b-6) to wind and join a sidewall, metal chafer, and the like in sequence to form a cylindrical third assembly. The third assembly is moved to (POS.b-2) and allowed to stand by. After the second assembly is formed and the first band forming drum 1 is moved to the (POS.a-1) side to the position where the first band forming drum 1 does not interfere with the first transfer 7, the first transfer 7 is moved to (POS.b). When the first transfer 7 reaches (POS.b), the third band forming drum 3 is moved to (POS.b), where the third assembly is inserted in the second assembly held by the first transfer 7. By expanding the drum 3, the third assembly is pressed against the inside of both end portions of the second assembly to form the fourth assembly. Then, the drum 3 is contracted and moved to the (POS.b-3) side for the formation of the next tire member.

Figure 2:
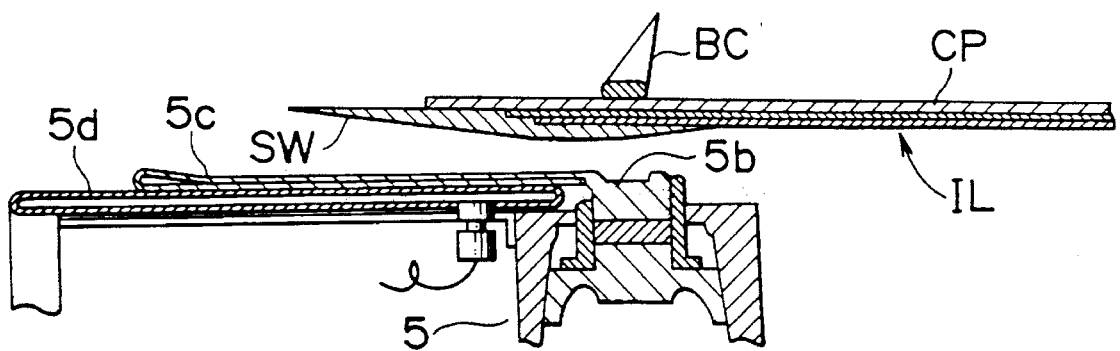
FIG. 2 is a view illustrating a state in which a fourth assembly is loaded onto a shaping drum of the forming apparatus.

After the third band forming drum 3 is moved to a position where it does not interfere with the first transfer 7, the first transfer 7 holding the fourth assembly is moved from (POS.b) to (POS.c). When the first transfer 7 reaches (POS.c), the shaping drum 5 is moved from (POS.c-1) to (POS.c), where the shaping drum 5 is inserted in the fourth assembly (FIG. 2 shows the state in which the insertion is completed). By expanding a bead holding portion 5b of the shaping drum 5, the fourth assembly is held by the bead holding portion 5b; the holding of the fourth assembly by the first transfer 7 is released. After the transfer of the fourth assembly is completed, the drum 5 is returned to (POS.c-1) to start shaping, while the first transfer 7 is returned to (POS.b) to receive a bead core for the next tire.

On the belt drum 4, a belt ply, a tread, etc. are laminated in sequence by reciprocating the expanded belt drum 4 between the positions (POS.c-3) to (POS.c-6) as necessary, to form a cylindrical belt-tread assembly. Then, the belt drum 4 is moved to (POS.c-2), where the belt-tread assembly is held by the second transfer 8, which is positioned at (POS.c-2), from the outside. By contracting the belt drum 4, the belt-tread assembly is transferred from the belt drum 4 to the second transfer 8.

Figure 3:
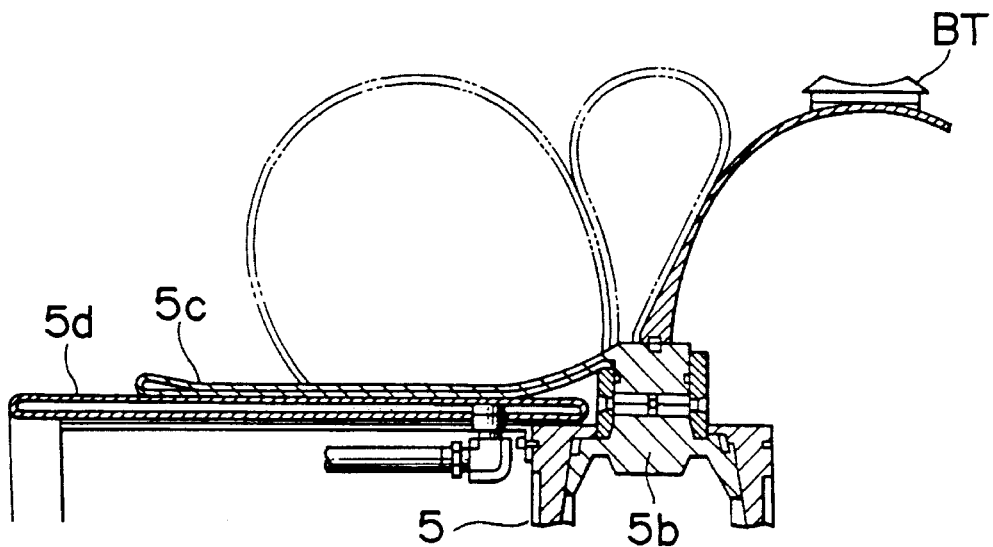
FIG. 3 is a view illustrating a state of forming using the shaping drum of the forming apparatus.

The second transfer 8, which has received the belt-tread assembly, is moved to (POS.c-1). On the shaping drum 5 on which shaping is started, while both of the bead holding portions 5b are brought close to each other, compressed air is injected so that the distance between both bead cores of the fourth assembly is increased, by which the fourth assembly is pressed against the inner peripheral surface of the belt-tread assembly. At the same time, compressed air is injected into bladders 5c and 5d to expand them as indicated by two-dot chain lines in FIG. 3, by which the portions outside the portion between both bead cores of the fourth assembly are expanded, and folded back so as to wrap the bead core to form a toroidal shape.

Next, the compressed air in the bladders 5c and 5d is expelled, and the tread and the sidewall are joined under pressure by the action of the stitcher 9 if necessary. The compressed air in the interior between both bead cores of the fourth assembly is expelled to complete a green tire. The completed green tire is moved to (POS.c) by being held by the second transfer 8, and delivered to the tire unloader 20 at (POS.c). The green tire is sent to the outside of the apparatus by means of the tire unloader 20, and the second transfer 8 is returned to (POS.c-2).

Figure 4:
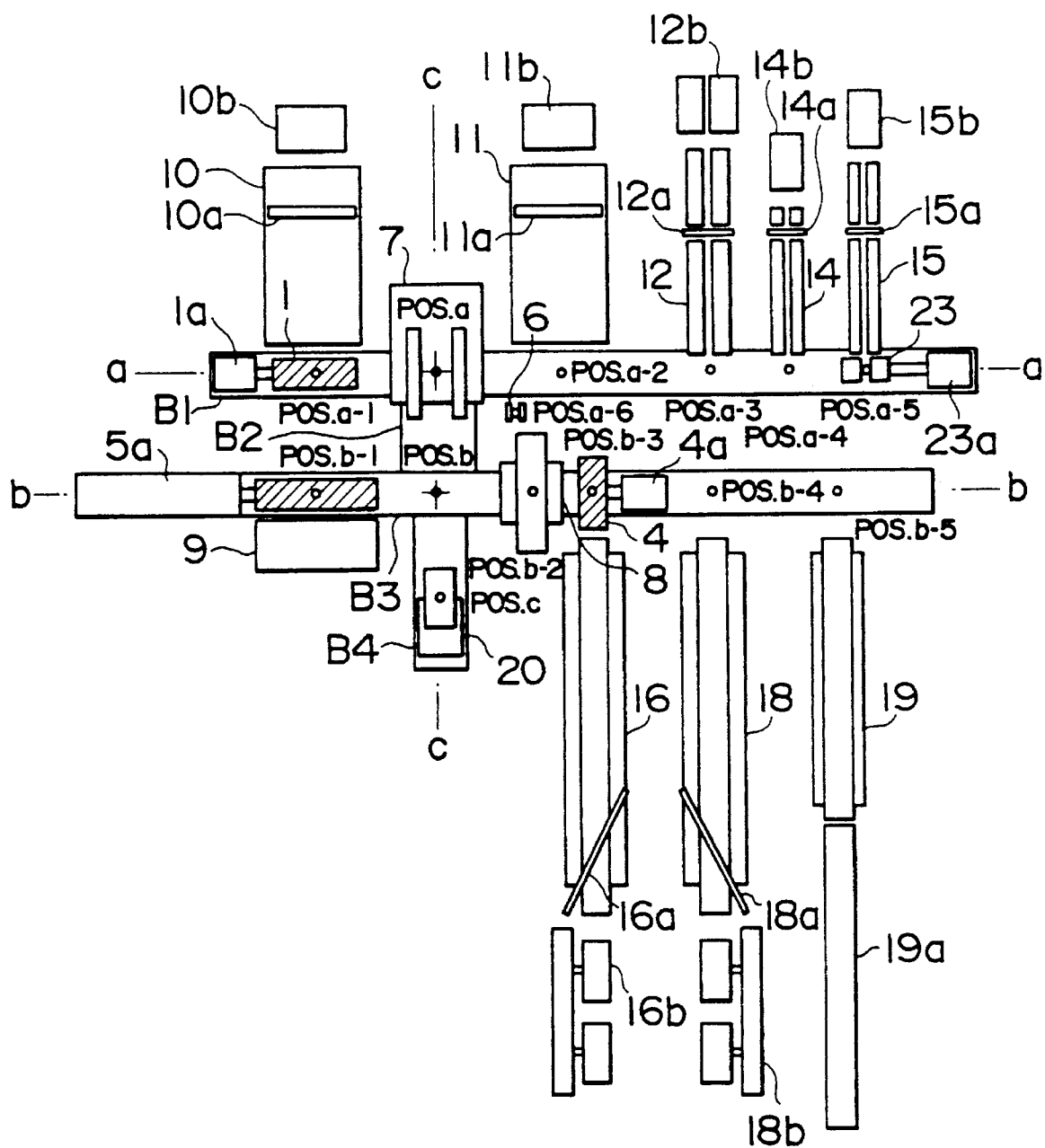
FIG. 4 is a plan view showing another embodiment of a forming apparatus used for carrying out a method of forming a radial tire.
Figure 5:
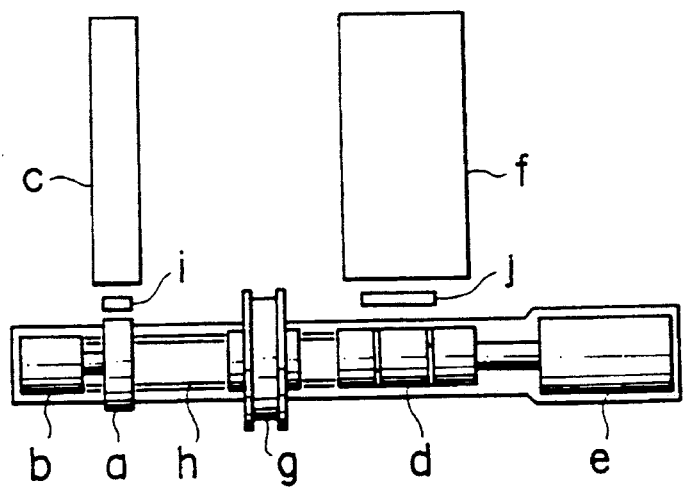
FIG. 5 is a plan view showing a conventional radial tire forming apparatus.
Figure 6:
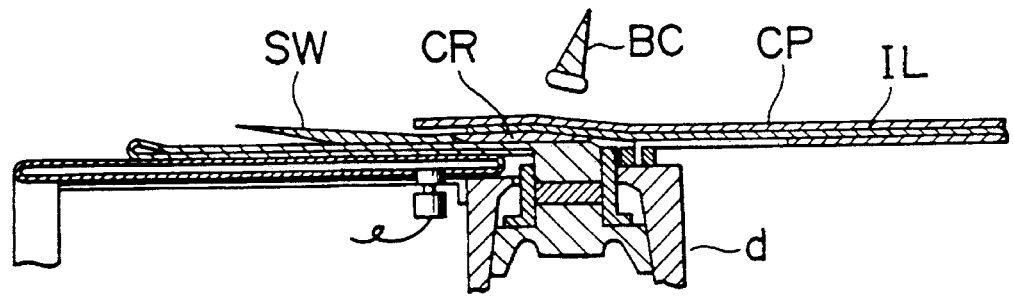
FIG. 6 is a view illustrating one state of a shaping drum of the conventional forming apparatus.
Figure 7:
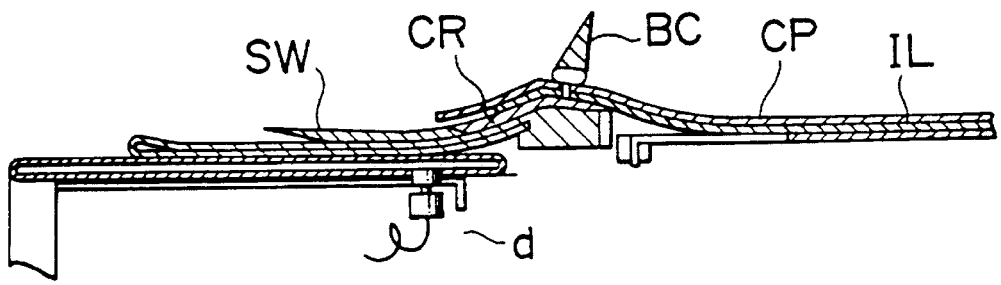
FIG. 7 is a view illustrating another state of the shaping drum of the conventional forming apparatus.

Next, another embodiment of a forming apparatus used for carrying out a method of forming a radial tire in accordance with the present invention will be described with reference to FIG. 4. In this figure, reference numeral 1 denotes a first band forming drum for an inner liner IL and a carcass ply CP. This first band forming drum 1 can slide on a first common bed B1. The band forming drum 1, having a head stock 1a incorporating drive means for rotating and expanding/contracting the drum 1, can move between positions (POS.a-1), (POS.a) and (POS.a-2) on a first axis (a—a).

Reference numeral 23 denotes a second band forming drum for a second assembly SW, which consists of a sidewall, a reinforcement band around the bead, and the like. This second band forming drum 23 can slide on the first common bed B1. The drum 23, having a head stock 23a incorporating drive means for rotating and expanding/contracting the drum 23, can move between positions (POS.a), (POS.a-3), (POS.a-4) and (POS.a-5) on the first axis (a—a).

Reference numeral 4 denotes a belt drum for a belt-tread assembly BT. This belt drum 4 can slide on a second common bed B3. The drum 4, having a head stock 4a incorporating drive means for rotating and expanding/contracting the drum 4, can move between positions (POS.b-2) to (POS.b-5) on a second axis (b—b).

Reference numeral 5 is a shaping drum for assembling the tire components, which have been formed into a cylindrical shape in advance, and forming the assembled components into a toroidal shape to produce a green tire. This shaping drum 5 can slide on the second common bed B3. The drum 5, having a head stock 5a incorporating drive means for rotating and expanding/contracting the shaping drum 5 and for bringing bead holding portions close to each other and separating them from each other, can move between (POS.b-1) and (POS.b) on the second axis (b—b).

Reference numeral 7 denotes a first transfer for transferring a bead core BC, a carcass ply CP, and the like to the shaping drum 5 by holding them from the outside. This first transfer 7 can slide on a third bed B2 connecting the first and second common beds B1 and B3, being movable between the intersections (POS.a) and (POS.b) of the first and second axes (a—a) and (b—b) along a centerline (c—c) at right angles to these axes.

Incidentally, reference numeral 6 denotes a bead supplier for supplying a bead core BC to the first transfer 7.

Reference numeral 8 denotes a second transfer for transferring a belt-tread assembly from the belt drum 4 to the shaping drum 5 by holding it from the outside. This second transfer 8 can slide on the second common bed B3, being movable between (POS.b-1) and (POS.b-2) on the second axis (b—b).

Reference numeral 9 denotes a stitcher for pressing the tire member on the shaping drum 5 against the drum 5 and joining it.

Reference numerals 10 and 11 denote servicers for supplying an inner liner IL and a carcass ply CP onto the first band forming drum 1, respectively. These servicers 10 and 11 are provided with automatic cutters 10a and 11a for cutting a material to a regular size and let off stands 10b and 11b, respectively.

Reference numeral 12 denotes a servicer for supplying a sidewall with abrasion rubber (hereinafter, simply called a sidewall) SW, 14 denotes a servicer for supplying a metal chafer, and 15 denotes a servicer for supplying a sidewall filler. These servicers 12, 14 and 15 are provided with automatic cutters 12a, 14a and 15a for cutting a material to a regular size and let off stands 12b, 14b and 15b, respectively.

Reference numerals 16 and 18 denote servicers for supplying a belt ply. These servicers 16 and 18 are provided with automatic cutters 16a and 18a for cutting a material to a regular size and let off stands 16b and 18b, respectively.

Reference numeral 19 denotes a servicer for supplying a tread. This servicer 19 is provided with a conveyor 19a for receiving a tread which has been cut to a regular size in advance and carried.

Reference numeral 20 denotes a tire unloader for taking a completely formed green tire out of the apparatus. This tire unloader 20 can slide on a fourth bed B4, being movable between (POS.b) and (POS.c) on the travel line (c—c).

The above-described individual devices are known, and therefore the detailed description thereof is omitted.

Next, the operation of the radial tire forming apparatus shown in FIG. 4 will be described in detail. This radial tire forming apparatus has three application examples.

First, a first application example will be described.

First of all, an inner liner IL is wound on the first band forming drum 1, with the outside diameter of the drum 1 being smaller than the inside diameter of the bead core BC, at (POS.a-1), and is joined into a cylindrical shape. When the first transfer 7 is positioned at (POS.b), the drum 1 is moved to (POS.a-2), where a carcass ply is laminated on the outer periphery of the inner liner IL and joined to form a carcass band CB, and returned to (POS.a-1).

Then, a bead core BC is supplied to the first transfer 7 by means of the bead supplier 6. After the first transfer 7 returns to (POS.a), the first band forming drum 1 is moved to (POS.a). By expanding the drum 1, the carcass band CB is pressed against the inner peripheral surface of the bead core BC to form a first assembly. The first assembly is held, together with the bead core BC, by the first transfer 7 from the outside. Then, the drum 1 is contracted and returned to (POS.a-1) to wind an inner liner for the next tire.

During this period of time, the contracted second band forming drum 23 is moved to (POS.a-3), (POS.a-4) and (POS.a-5) to wind a sidewall, a metal chafer, etc. in sequence and join them to form a cylindrical second assembly. After the first assembly is formed and the first band forming drum 1 is moved to the (POS.a-1) side to a position where the drum 1 does not interfere with the first transfer 7, the second band forming drum 23 is moved to (POS.a), where the second assembly is inserted in the first assembly held by the first transfer 7. By expanding the drum 23, the second assembly is pressed against the inside of both end portions of the first assembly to form a third assembly. Then, the drum 23 is contracted for the formation of the next tire member, and is moved to the (POS.a-3) side.

After the second band forming drum 23 is moved to a position where the drum 23 does not interfere with the first transfer 7, the first transfer 7 holding the third assembly is moved from (POS.a) to (POS.b). When the first transfer 7 reaches (POS.b), the shaping drum 5 is moved from (POS.b-1) to (POS.b), where the shaping drum 5 is inserted in the third assembly (FIG. 2 shows the state in which the insertion is completed). By expanding a bead holding portion 5b of the shaping drum 5, the third assembly is held by the bead holding portion 5b; the holding of the third assembly by the first transfer 7 is released. After the transfer of the third assembly is completed, the drum 5 is returned to (POS.b-1) to start shaping, while the first transfer 7 is returned to (POS.a).

On the belt drum 4, a belt ply and a tread are laminated in sequence by reciprocating the expanded belt drum 4 between the positions (POS.b-3) (POS.b-4) and (POS.b-5) as necessary, to form a cylindrical belt-tread assembly (fourth assembly). Then, the belt drum 4 is moved to (POS.b-2), where the belt-tread assembly is held by the second transfer 8, which is positioned at (POS.b-2), from the outside. By contracting the belt drum 4, the belt-tread assembly is transferred from the belt drum 4 to the second transfer 8. The second transfer 8, which has received the belt-tread assembly, is moved to (POS.b-1). On the shaping drum 5 on which shaping is started, while both of the bead holding portions 5b are brought close to each other, compressed air is injected so that the distance between both bead cores of the third assembly is increased, by which the third assembly is pressed against the inner peripheral surface of the belt-tread assembly (fourth assembly). At the same time, compressed air is injected into bladders 5c and 5d to expand them as indicated by two-dot chain lines in FIG. 3, by which the portions outside the portion between both bead cores of the third assembly are expanded, and folded back so as to wrap the bead core to form a toroidal shape.

Next, the compressed air in the bladders 5c and 5d is expelled, and the tread and the sidewall are joined under pressure by the action of the stitcher 9 if necessary. The compressed air in the interior between both bead cores of the third assembly is expelled to complete a green tire. The completed green tire is moved to (POS.b) while being held by the second transfer 8, and delivered to the tire unloader 20 at (POS.b). The green tire is sent to the outside of the apparatus by means of the tire unloader 20, and the second transfer 8 is returned to (POS.b-2).

Next, a second application example will be described.

When the first transfer 7 is positioned at (POS.b), the first band forming drum 1 is expanded and moved to (POS.a-2), where a carcass ply CP is wound and joined into a cylindrical shape, and then the drum 1 is returned to (POS.a-1).

Then, a bead core BC is supplied to the first transfer 7 by means of the bead supplier 6. After the first transfer 7 returns to (POS.a), the first band forming drum 1 is moved to (POS.a). By expanding the drum 1, the cylindrical carcass band CB is pressed against the inner peripheral surface of the bead core BC to form a 1—1 assembly. The 1—1 assembly is held by the first transfer 7. Then, the drum 1 is contracted and returned to (POS.a-1), where an inner liner IL is wound and joined to form a cylindrical 1-2 assembly. The drum 1 is again moved to (POS.a), and inserted in the 1—1 assembly held by the first transfer 7. By expanding the drum 1, the cylindrical inner liner is pressed against the inner peripheral surface of the 1—1 assembly to form a first assembly. Then, the drum 1 is contracted and returned to (POS.a-1). The first band forming drum 1 is configured as follows, for example: The metal cylinder is divided into a plurality of segments in the circumferential direction so that each segment is movable in the radial direction at the same time. The outer surface of each segment is covered by cylindrical rubber, and both ends of the cylindrical rubber are airtightly fixed to the body so that compressed air can be injected to the inside. When the cylindrical carcass ply is expanded, the expansion of each segment allows the inner peripheral surface of the bead core to be surely pressed, while when the cylindrical inner liner is expanded, the injection of compressed air into the inside of cylindrical rubber allows the inner liner to be expanded from the center. Since a member, such as a sidewall, with a diameter larger than that of the inner liner is not assembled on both ends of the inner liner, the air between the cylindrical carcass ply and inner liner is allowed to flow out smoothly, so that the problem of air being trapped between them is solved.

The subsequent operation is the same as that of the above-mentioned first application example; therefore, the detailed description is omitted.

Next, a third application example will be described.

When the first transfer 7 is positioned at (POS.b), the first band forming drum 1 is expanded so that the outer peripheral length of the carcass ply to be formed into a cylindrical shape is equal to the inner peripheral length of the bead core. The first band forming drum 1 is moved to (POS.a-2), where a carcass ply CP is wound and joined into a cylindrical shape. Then, the first band forming drum 1 is returned to (POS.a-1), and the carcass ply CP is elastically deformed temporarily into a standing wave shape inward in the radial direction (refer to FIG. 8).

Then, a bead core BC is supplied to the first transfer 7 by means of the bead supplier 6. When the first transfer 7 returns to (POS.a), the first band forming drum 1 is moved to (POS.a), where the carcass ply CP formed into a standing wave shape is inserted in the bead core BC. The elastic deformation of the carcass ply CP is eliminated by expanding the drum 1, and the carcass ply CP is pressed against the inner peripheral surface of the bead core BC to form a 1—1 assembly. The 1—1 assembly is held by the first transfer 7, and the drum 1 is contracted and returned to (POS.a-1), where an inner liner IL is wound and joined into a cylindrical 1-2 assembly. The drum 1 is again moved to (POS.a), and inserted in the 1—1 assembly held by the first transfer 7. By expanding the drum 1, the cylindrical inner liner (1-2 assembly) is pressed against the inner peripheral surface of the 1—1 assembly to form a first assembly. Then, the drum 1 is contracted and returned to (POS.a-1). Depending on the stiffness of the laminated body of inner liner IL and carcass ply CP, an inner liner IL is wound on the first band forming drum 1 expanded at (POS.a-1) and joined into a cylindrical shape, and then the drum 1 is moved to (POS.a-2), where a carcass ply CP is laminated and wound on the outer peripheral surface of the already wound inner liner IL and joined to form a cylindrical carcass band CB. Then, the drum 1 is returned to (POS.a-1) and the carcass ply CP is elastically deformed temporarily into a standing wave shape inward in the radial direction. After that, the drum is moved to (POS.a), where the carcass band CB is inserted in the bead core BC held by the first transfer 7. The elastic deformation of the carcass ply CP is eliminated, and the carcass band CB is pressed against the inner peripheral surface of the bead core BC to form a first assembly.

The subsequent operation is the same as that of the above-mentioned first application example; therefore, the detailed description is omitted.

I claim:

1. A method of forming a radial tire comprising the steps of:

deforming elastically a carcass band having a cylindrical shape so that the outer peripheral length thereof is equal to the inner peripheral length of a bead core, temporarily into a standing wave shape;

locating said bead core at a predetermined position on the outside of said carcass band;

eliminating the elastic deformation of said carcass band;

pressing said carcass band against the inner peripheral surface of said bead core to form a first assembly;

externally holding said first assembly using a first transfer;

locating an inner liner band having a cylindrical shape such that the outside diameter thereof is smaller than the inside diameter of said first assembly, at a predetermined position in said first assembly while said first assembly is held by said first transfer;

expanding and pressing said inner liner band against the inner peripheral surface of said first assembly to form a second assembly;

locating a third assembly composed of at least a sidewall and chafer and having a cylindrical shape such that the outside diameter thereof is smaller than the inside diameter of said second assembly, at a predetermined position in said second assembly;

expanding and pressing said third assembly against the inner peripheral surface of said second assembly to form a fourth assembly;

moving said fourth assembly while said fourth assembly is held by said first transfer to a predetermined position on a shaping drum;

forming said fourth assembly into a toroidal shape; and assembling said fourth assembly to a belt-tread assembly of cylindrical shape, to form a green tire.

2. A method of forming a radial tire comprising the steps of:

joining a carcass ply into a cylindrical shape on a first band forming drum to define a carcass band having an outer peripheral length equal to the inner peripheral length of a bead core;

deforming elastically the carcass band temporarily into a standing wave shape;

locating said bead core at a predetermined position on the outside of said carcass band;

eliminating the elastic deformation of said carcass band;

pressing said carcass band against the inner peripheral surface of said bead core to form a first assembly;

externally holding said first assembly using a first transfer;

forming an inner liner band using a second band forming drum into a cylindrical shape such that the outside diameter thereof is smaller than the inside diameter of said first assembly;

locating said inner liner band at a predetermined position in said first assembly while said first assembly is held by said first transfer;

expanding and pressing said inner liner band against the inner peripheral surface of said first assembly to form a second assembly;

forming a third assembly composed of at least a sidewall and chafer using a third band forming drum into a cylindrical shape such that the outside diameter thereof is smaller than the inside diameter of said second assembly;

locating said third assembly at a predetermined position in said second assembly;

expanding and pressing said third assembly against the inner peripheral surface of said second assembly to form a fourth assembly;

forming a belt-tread assembly into a cylindrical shape; and moving said fourth assembly while held by said first transfer to a predetermined position on a shaping drum;

forming said fourth assembly into a toroidal shape while wrapping the bead core; and assembling said fourth assembly to said belt-tread assembly while said belt-tread assembly remains cylindrical in shape, to form a green tire.

\* \* \* \* \*